Patented Nov. 20, 1951

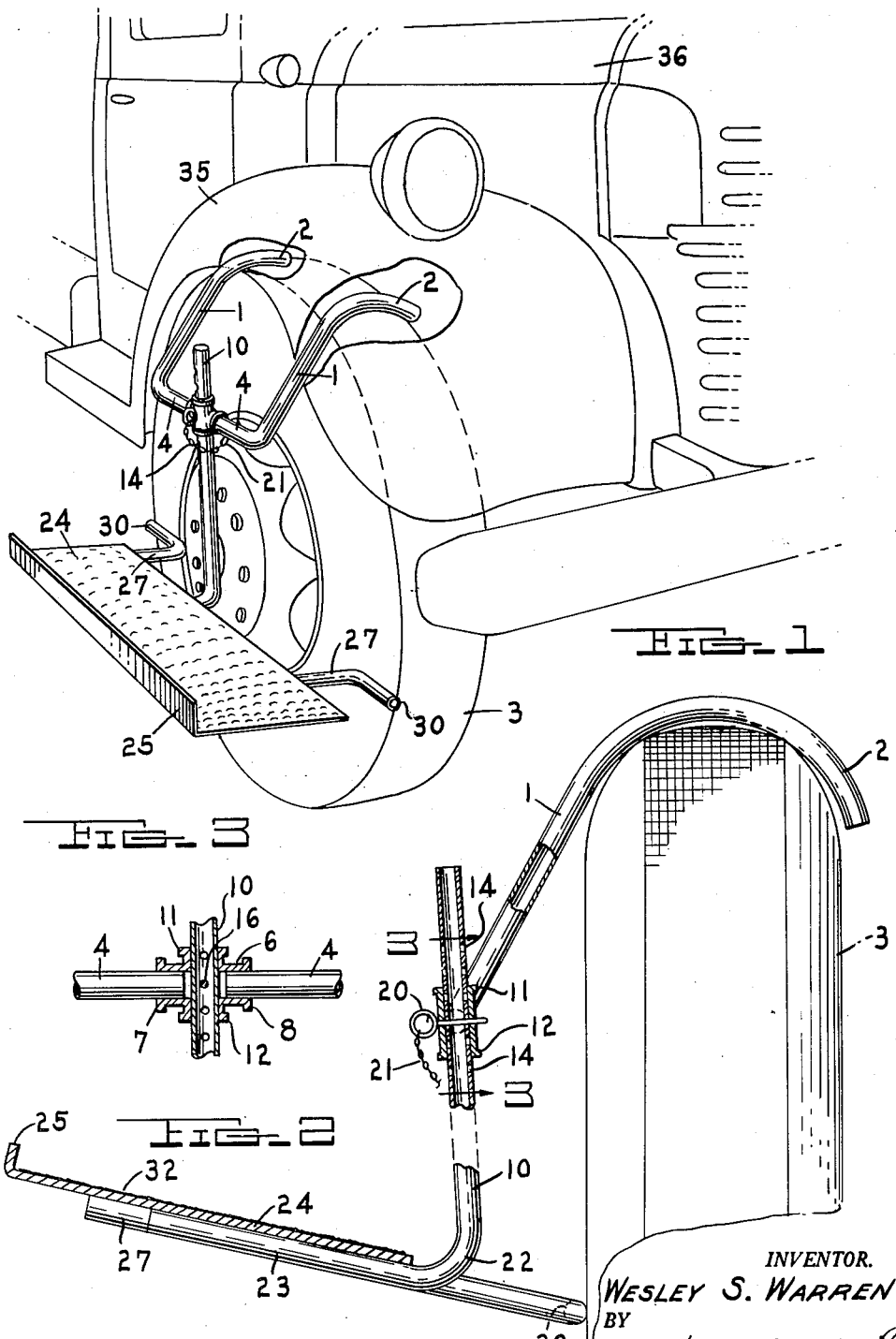

2,575,503

UNITED STATES PATENT OFFICE 2,575,503

MECHANIC'S SUPPORT

Wesley S. Warren, Ann Arbor, Mich., assignor to Miller Manufacturing Co., Detroit, Mich., a corporation of Michigan Application May 11, 1948, Serial No. 26,357

1 Claim. (Cl. 304—15)

This invention has to do with facilitating a mechanic's access to the engine compartment of automotive vehicles and particularly vehicles commonly known as trucks or tractors.

As is well known, the engine compartment is usually at the front of the vehicle under the hood or bonnet and in many large trucks or tractors, it is difficult for a mechanic to get into a position for working on or about the engine. This is because the engine is positioned more or less between the front wheels and because of the large fenders and other structure over which the mechanic must reach in order to perform work in the engine compartment.

The aim of the present invention is to provide an improved device for supporting the mechanic and upon which the mechanic may stand in an elevated position in order to reach the engine and parts about the same. In accordance with the invention, an improved simplified structure is provided, which can be suspended from the wheel of the vehicle to support a step plate in an elevated position. While the structure has been simplified in order that it may be manufactured and offered to the trade at a low cost, yet the structure is strong and durable and provides a stable step or support. A device constructed in accordance with the invention is shown in the accompanying drawings:

Fig. 1 is a perspective view illustrating the device of the invention as applied to the wheel of a truck.

Fig. 2 is a view of the device as applied to a wheel with some parts cut away and some parts in section.

Fig. 3 is a sectional view taken substantially on line 3—3 of Fig. 2.

The step plate structure comprises an upper yoke member of somewhat of U formation and having two arms 1 which, when in position on the wheel of a vehicle extend angularly upwardly as shown in Fig. 3. Each arm terminates in a curved or hooked portion 2 for engaging over the top of a wheel. Specifically, the yoke is formed so as to engage over a pneumatic tire as illustrated at 3. The members of the yoke are preferably tubular and the yoke has a bight portion comprised of inwardly extending parts 4.

The two parts of the yoke may be of separate pieces and are united by a central fitting generally illustrated at 6. The end of each inward extension 4 is suitably secured in the opposite extensions 7 and 8 of the fitting. The members 4 may be screw threaded or welded or otherwise secured to the fitting.

A depending post preferably of tubular form, and illustrated at 10, is slidably disposed in the fitting extending through the body thereof and through opposite extensions 11 and 12 thereof. The post is provided with a plurality of apertures 14 and the fitting is provided with aligned apertures 16 so that the post may be slidably adjusted and locked in position by a pin 20 which may be passed through aligned apertures. The pin is preferably permanently attached to the structure as by means of a flexible element such as a chain or cable 21 secured at one end to the eye of the pin and at its other end to the yoke.

The depending post is fashioned with a bend, as shown at 22. This bend is such as to provide an end portion 23 which preferably extends angularly upwardly from the bend as shown in Fig. 2. A step plate 24, preferably with an outer flange 25, is secured to the supporting arm 23 preferably by welding, with the arm 23 substantially centrally disposed relative to and on the under side of the step plate. On the underside of each step plate, preferably adjacent each end, is a strut 27. These struts are preferably tubular in form and are preferably welded to the underside of the step plate and have end portions projecting toward the wheel. These end portions are flared or bent outwardly to form engaging elements 30 for engaging the wheel, and more specifically, the pneumatic tire. The step plate is preferably of sheet steel and its surface is preferably roughened as at 32.

When the device is applied to the vehicle, as illustrated in Fig. 1, the yoke is passed under the vehicle fender 35 with the hook portions 2 engaged over the top surface of the wheel. The two arms of the yoke are preferably spaced substantially equally from a vertical center line through the wheel so that the curvature of the wheel holds the yoke and prevents it from slipping circumferentially. The yoke is shaped so that the depending post 10 is spaced outwardly from the wheel as shown in Fig. 2 and is in a substantially vertical position when the struts engage the wheel as shown in Figs. 1 and 2. The engine compartment is, as above described, within the hood or bonnet 36, which may be elevated in the usual fashion for access to the compartment. The operator or mechanic before or after applying the device to the wheel, may adjust the step plate as to its height by removing the pin 20 and adjustably moving the post in the center fitting, replacing the pin when the proper height adjustment has been made. The operator may then stand upon the plate 24 in an elevated position so that he may lean over the fender or any other parts exterior of the engine compartment in order to perform work on the engine or other parts or mechanism in the engine compartment.

The simple construction makes for economical manufacture so that the device may be supplied to the trade at a low cost. While the structure is strong and stable it is compact and relatively light in weight so that it can be easily applied to and removed from the wheel and can be stored in a small place when not in use. Notwithstanding the fact that a single depending post carries the vertical load the step plate is solidly held in position by reason of the struts which engage the outer face of the wheel.

I claim:

A mechanic's supporting device for use with an automotive vehicle comprising a yoke structure having two spaced arms with hooked ends adapted to engage over the top of a wheel of the vehicle to suspend the device therefrom, the yoke structure having a bight portion connecting the arms at ends thereof opposite the hooked ends, a fitting in the central part of the bight portion having a passage therethrough extending substantially vertical when the yoke structure is suspended from the wheel, a single post, said post being arranged to slidably and removably fit in the passage of the fitting, releasable means for holding the post in adjusted position in the fitting so that the post depends therefrom when the yoke is suspended from the wheel, the lower end of the post extending outwardly from the wheel, a plate mounted substantially centrally on the lower outwardly extended end of the post and adapted to have a mechanic stand thereon, and struts secured to the plate on the underside thereof and adjacent opposite ends thereof, said struts projecting from the plate and having end portions adapted to engage the wheel on opposite sides of a vertical center line through its axis to stabilize the plate.

WESLEY S. WARREN.

REFERENCES CITED

The following references are of record in the file of this patent:

UNITED STATES PATENTS

| Number | Name | Date |
|---|---|---|
| 356,457 | Dudley | Jan. 25, 1887 |
| 1,018,877 | Chickering | Feb. 27, 1912 |
| 1,596,572 | Bates | Aug. 17, 1926 |
| 1,669,329 | Elder | May 8, 1928 |
| 1,695,428 | Johnson | Dec. 18, 1928 |
| 2,316,723 | Sorenson | Apr. 13, 1943 |
| 2,378,678 | Anderson | June 19, 1945 |